(12) United States Patent  (10) Patent No.: US 8,688,480 B1
Singh et al.  (45) Date of Patent: Apr. 1, 2014

(54) AUTOMATED ACCOUNTS RECEIVABLE MANAGEMENT SYSTEM WITH A SELF LEARNING ENGINE DRIVEN BY CURRENT DATA

(75) Inventors: Vijay Singh, Chicago, IL (US); C. Shane Colley, Chicago, IL (US); Paul T. Cottey, Chicago, IL (US); Logan Johnston, Waxhaw, NC (US); Noel Juaire, Lake Oswego, OR (US); Akshya Kumar, Westmont, IL (US); John Sparby, Birmingham, MI (US)

(73) Assignee: Accretive Health, Inc., Chicago, IL (US)

( * ) Notice: Subject to any disclaimer, the term of this patent is extended or adjusted under 35 U.S.C. 154(b) by 122 days.

(21) Appl. No.: 12/799,624

(22) Filed: Apr. 28, 2010

Related U.S. Application Data

(60) Provisional application No. 61/214,735, filed on Apr. 28, 2009.

(51) Int. Cl.
*G06Q 40/00* (2012.01)
*G06Q 10/00* (2012.01)
*G06Q 50/00* (2012.01)

(52) U.S. Cl.
USPC ...................................... 705/4; 705/2; 705/3

(58) Field of Classification Search
USPC ........................................................ 705/2–4
See application file for complete search history.

(56) References Cited

U.S. PATENT DOCUMENTS

| | | | |
|---|---|---|---|
| 2002/0026328 A1* | 2/2002 | Westerkamp et al. | 705/2 |
| 2005/0137912 A1* | 6/2005 | Rao et al. | 705/4 |
| 2008/0040164 A1* | 2/2008 | Curtin et al. | 705/4 |
| 2008/0103826 A1 | 5/2008 | Barrett | |
| 2008/0189202 A1 | 8/2008 | Zadoorian et al. | |
| 2008/0208640 A1 | 8/2008 | Thomas et al. | |

OTHER PUBLICATIONS

Securing Revenue with Improved Data Use, MedAssets, Inc., *HFMA Educational Report*.
John R. Thomas, MedSynergies, "Accounts Receivable Management: Task Management versus Denial Management" Oct. 2007.
U.S. Appl. No. 12/194,721, filed Aug. 20, 2008, Owen, et al.

* cited by examiner

*Primary Examiner* — Joseph Burgess
(74) *Attorney, Agent, or Firm* — John S. Paniaguas; Katten Muchin Roseman LLP

(57) ABSTRACT

An automated system is disclosed for managing accounts receivable for outstanding healthcare accounts. In particular, the system in accordance with the present invention is an automated system which preemptively assesses the risk of denials of outstanding healthcare accounts by way of a self-learning engine driven by current data and prioritizes those accounts for follow up according to the risk profile of the account. As such, the system is able to minimize denials by the respective payers thereby improving optimizing the efforts of healthcare accounts receivable personnel while improving the revenue yield and minimizing the revenue cycle.

14 Claims, 13 Drawing Sheets

| Input Data | | Meaning |
|---|---|---|
| Admission DRG | | DRG (Diagnosis Related Groups) codes upon admission. These are diagnosis codes for In-Patients. |
| Admitting Physician | | Physician who admitted the patient into the hospital. |
| Coverage Complete | | If the coverage check (insurance verification check for benefits information) for the patient is complete or not |
| Coverage Complete System | | If the coverage check was completed by the system through an automated process or by a registrar at the hospital |
| Coverage Count | | The number & type of coverages a person has (Primary, Secondary, Tertiary) |
| Coverage Last Action User | | The last person to check benefits for the person |
| Discrete Year Born | | Age groupings |
| DRG Change | | Changed in DRG - between Admission & Final DRGs |
| EncounterID | | Visit number assigned by hospital information system for each visit of the patient to the hospital |
| FacilityPatientType | | Internal classification of patient type as determined by each hospital |
| FinalDRG | | Final DRG for the patient visit |
| Gender | | Patient's Gender |
| Has Denials | ☐ | An indicator field that shows if the patient visit had any denials from the insurance company |
| Has Exception | * | An indicator field that shows if the patient visit had a denial or a write off or a high adjustment |
| Has Write Off | ☐ | An indicator field that shows if the patient visit had a write off |
| Has Write Off or Denial | ☐ | An indicator field that shows if the patient visit had a write off or a denial |
| HighAdjustment | ☐ | An indicator field that shows if the patient visit had a high adjustment (>=95% of charges) |
| IsScheduled | | An indicator field that shows if the patient visit was scheduled or a walk-in |
| Original Financial Class | | The original financial class of the patient visit |
| Patient Complete | | An indicator that shows if the patient information has been fully gathered and validated. |
| Patient Type | | An indicator field denoting the type of patient visit (I = Inpatient, E=Emergency, O=Outpatient, S=Surgery) |
| Primary Diagnosis Group | | For the primary diagnosis of the patient, the grouping the diagnosis belongs to |
| Primary Diagnosis Major Code | | The highest level of categorization of the primary diagnosis |
| Primary Payor | | The insurance company |
| Primary Plan | | The plan with the insurance company that the patient belongs to |
| Primary Service Major Code | | The highest level of categorization of the services performed on the patient |
| Primary Status | | Status of the benefits check of the primary insurance (Passed/Failed/TBD) |
| Primary Type | | Categorization of the primary insurance type (e.g. Medicare, Medicaid, Blue Cross, HMO, PPO, etc.) |
| Secondary Type | | Categorization of the secondary insurance type (e.g. Medicare, Medicaid, Blue Cross, HMO, PPO, etc.) |
| Service Location | | Hospital location where the patient was treated |

\* For Prediction Only
☐ Ignored

*Fig. 3*

| Tree | Task | Columns | Config | | | | | | |
|---|---|---|---|---|---|---|---|---|---|

Risk Rules

Filter [Select Filter] [v] LIKE [v] [Filter]   Page [2] of 25

| | Has Exception % | Has Exception # | Write Off # | Denials # | HighAdj # | RiskLevel | Condition | Rule Type | Active |
|---|---|---|---|---|---|---|---|---|---|
| 1 | 100.00 | 2 | 0 | 0 | 3 | | Service Location= 'WMN' and Original Financial Class = 'M' and Patient Type = 'Scheduled IP' | | No |
| 2 | 100.00 | 2 | 0 | 0 | | | Service Location= 'URO' and Primary Plan = 'BSO' | | No |
| 3 | 100.00 | 1 | 0 | 0 | 1 | | Service Location= 'WMN' and Original Financial Class <> 'M' and Original Financial Class <> 'F' and Primary Payor <> 'USA HEALTH' and Patient Type | | No |
| 4 | 100.00 | 1 | 1 | 0 | 0 | | Service Location= 'ERS' and Primary Plan <> 'W20' and Coverage Last Action User <> 'mwallace' and Primary Status = 'Passed' and Primary Plan <> WO | | No |
| 5 | 100.00 | 1 | 1 | 0 | 0 | | Service Location= 'DIA' and Admitting Physician <> 'BOERNER, JAMES L' and Coverage Last Action User = 'mwallace' | | No |
| 6 | 100.00 | 82 | 0 | 0 | | 1 | Service Location= 'PED' and Primary Payor= 'BCBSTN' and Patient Type = 'High $ Diagnostic' and Original Financial Class <> 'R' and Primary Plan = 'B02' | | Yes |
| 7 | 100.00 | 12 | 0 | 0 | | 2 | Service Location= 'WMN' and Primary Plan = 'C06' and Original Financial Class <> 'P' and Primary Type = 'BC' | | Yes |
| 8 | 99.00 | 2 | 1 | 2 | 0 | | Service Location= 'MED' and Original Financial Class <> 'P' and Primary Type = 'BC' | | No |
| 9 | 99.00 | 100 | 0 | 0 | 110 | | Service Location= 'PED' and Primary Payor = 'BCBSTN' and Facility Patient Type = 'D' and Primary Diagnosis Group <> '779' and Admitting Physician < | | No |
| 10 | 99.00 | 1 | 2 | 0 | 0 | | Service Location= 'GYN' and Primary Payor = 'AETNA' | | No |
| 11 | 99.00 | 1 | 0 | 0 | 0 | | Service Location= 'NUC' and Primary Payor = 'HUMANA' | | No |
| 12 | 98.00 | 3 | 0 | 0 | 4 | | Service Location= 'BWS' and Discrete Year Born = '0-17' | | No |
| 13 | 98.00 | 1 | 0 | 1 | 0 | | Service Location= 'BWO' and Primary Type - 'MEDICARE' | | No |
| 14 | 97.00 | 162 | 4 | 0 | 225 | | Service Location= 'NSY' and Primary Payor = 'BCBSTN' and Facility Patient Type = 'G' | | No |
| 15 | 97.00 | 1 | | | | | Service Location= 'WMN' and Original Financial Class <> 'M' and Original Financial Class <> 'F' and Primary Payor <> 'USA HEALTH' and Patient Type | | No |

The follow-up tool identifies accounts within risk assignments into the following Key Categories
1) *Denial Management*—both electronic and paper remittances; outlines line item rejections
2) Potentially Missed Secondary Accounts—primary payer has paid on the account, balance still left
3) Balances not transferred to the next payor
4) Accounts with Insurance Balanced transferred to the patient
5) Accounts transferred between payor groups

| Follow Up Advice | |
|---|---|
| Risk Type | Advice |
| Residual | Coverage was found for the user post-discharge but the initial self pay discount was not removed. If the self pay discount remains attached to the visit, the amount will end up getting written-off. |

*Fig. 10B*

The process uses a thorough analysis of payer risk (based on payer experience, type of service, age, etc.) to prioritize follow-up and allocate resources by skill levels according to the risk profile of accounts.

| Risk Stratification | Skill Type | Account Type |
|---|---|---|
| Easy (ie: <60 days) | Less Senior | Status the claim with the payor to ensure receipt, follow-up on any additional documentation |
| Medium (ie: 60-120 days) | Intermediate | Straightforward denials (incorrect plans); COB Issues, etc; system problems requiring medical review or management approval to pay |
| Hard (ie: >120 days) | Best Critical Thinkers | Cost/charge outlier cases; benefits exhausted claims; partial stay and level of care | thus ignoring low balances, which may carry the most risk of non-payments.

*Fig. 11*

AUTOMATED ACCOUNTS RECEIVABLE MANAGEMENT SYSTEM WITH A SELF LEARNING ENGINE DRIVEN BY CURRENT DATA

CROSS-REFERENCE TO RELATED APPLICATIONS

This application claims priority and the benefit of U.S. Provisional Application No. 61/214,735, filed Apr. 28, 2009.

COMPUTER APPENDIX

This application includes a Computer Listing Appendix on compact disc, hereby incorporated by reference.

BACKGROUND OF THE INVENTION

1. Field of the Invention

The present invention relates to an automated system for managing accounts receivable for outstanding healthcare accounts which preemptively assesses the risk of denials of outstanding healthcare accounts by way of a self-learning engine driven by current data and prioritizes the accounts for follow up according to the risk profile of the account in order to minimize denials by the respective payers and improve the revenue yield while minimizing the revenue cycle.

2. Description of the Prior Art

In general, known medical billing systems, currently being used by healthcare providers, provide statements of current charges for all healthcare services and supplies (collectively "healthcare resources") to insurance companies, patients and third party payers. In order to facilitate processing of claims for healthcare resources, the American Medical Association (AMA) publishes standardized procedural terminology and associated procedural codes for a myriad of healthcare services including examination, diagnostic, and procedural services. For example, current medical procedure codes are published in "Current Procedural Terminology" $4^{th}$ edition, published by the AMA, hereby incorporated by reference. The procedural terminology and associated diagnostic codes promulgated by the AMA are the most widely accepted medical nomenclature used to report medical procedures and services under public and private health insurance programs. This procedural terminology is also used for administrative management purposes, such as, claims processing and for developing guidelines for medical care review.

The AMA also publishes codes for medical supplies, also used in processing medical claims. The current codes for medical supplies are published in: "AMA HCPCS 2007 Level II", published by the AMA, hereby incorporated by reference.

The medical procedure codes greatly streamline the billing process once the codes are entered into the billing records of the patients. In particular, medical procedure codes are manually entered into the patient records for the medical supplies and services provided to the patient by various medical personnel employed by the healthcare provider. On various occasions, incorrect medical billing codes may be recorded in the patient records that are ultimately rejected by the patient's insurance company.

Even though the medical billing codes mentioned above streamline the healthcare billing process, incorrect medical billing codes are sometimes inadvertently included in a patient account. Incorrect billing codes lead to claim denials and thus lost revenue. In addition to lost billing codes, there are a myriad of other reasons for which a medical claim can be denied. One of the more common reasons is that additional documentation is required before the claim can be paid. Many known healthcare accounts receivable management systems initiate follow-up on a claim by claim basis once the claim is denied by the respective payer. Such follow-up requires making a determination of the exact reason for the denial of the claim by the payer and resolving the issue that caused the claim to be denied, if possible. In the cases of claim denials based upon missing documentation, the missing documentation is not normally supplied to the third party payer until after the claim is denied; thereby increasing the revenue cycle, i.e., time from date of discharge of a patient to the date the claim is paid. Due to the volume of accounts receivable that a given healthcare provider has at any given time, manual follow up on each account is virtually impossible.

As such automated systems have been developed. An example of such automated systems for accounts receivable management is disclosed in US Patent Application Publication Nos. US 2008/0208640 A1; US 2008/0103826 A1; and US 2008/0189202 A1, hereby incorporated by reference. Commonly-owned and co-pending U.S. patent application Ser. No. 12/194,721, filed Aug. 20, 2008, entitled "Healthcare Predictive Payment Method" and US Patent US Patent Application Publication Nos. US 2008/0208640 A1 disclose the use of statistical models to predict the patient payment behavior. Such systems are only useful for predicting payment of individual patients. As such, the systems described above are unable to assess the risk of denial of third party healthcare payers, such as insurance companies and Medicare.

US Patent Application Publication No. US 2008/0103826 A1 relates to an automated system for management of health care accounts receivable. In this system, a healthcare provider reports claims level data to a third party "financial intermediary". The financial intermediary prepares a claim for submittal to a third party payer based upon historical and updated data of the payer, patient and the healthcare provider. Upon approval of the claim form by the healthcare provider, the third party beneficiary submits the claim to the third party payer for payment. Payments less a service fee are credited to the healthcare provider's account. In this system, the administrative overhead associated with healthcare accounts receivable is shifted to a third party, i.e., the financial beneficiary. The system can accelerate payments to the healthcare provider by enabling the healthcare provider to take advantage of the financial intermediary's administrative staff. Even with the assistance of the third party financial intermediary, the system is relatively inefficient since the claims are handled on a claim by claim basis.

US 2008/0189202 A1 discloses a web-based system for collecting overdue health care accounts. The system ranks each overdue account by various factors, such as, (a) outstanding unpaid balance; (b) age of account; (c) prior collection history; (d) demographics of the debtor profile, based on household income and home value; (e) geographic distribution of debtor, based on a parameter which is a member selected from a state and a zip code; (f) type of service provided to the debtor (grouped by DRG codes); (g) date of service provided (grouped in 30 day increments from posting date); and (h) type of debtor/payer classification, the type being a member selected from the group consisting of individual, insurance provider and government provider. The overdue accounts are ranked based on those factors and auctioned for purchase by a third party. Although the system may provide some relief to healthcare providers for overdue accounts, such a system is not useful in accelerating payments to healthcare providers nor in identifying systemic problems in accounts. Also, such a system increases the cost of collection of patient accounts. Moreover, such a system is only useful for predicting payment of individual patients. As such, the system described above is unable to assess the risk of denial of third party healthcare payers, such as insurance companies and Medicare.

Many known health care management systems manage health care accounts receivable by way of the age of the account and the size of the account. With such a system, accounts whose value is greater than a predetermined value are handled prior to lesser value accounts. Unfortunately, there are several problems with such a system. The most significant problem relates to duplication of work. More particularly, in such known systems resolution of the problem leading to the denial of payment are handled on an account by account basis. Thus, in situations in which payment denials are based on the same reason, the resolution of additional claim denials based upon the same reason involved duplication of work by account receivable personnel. For example, if 50 claims from Dr. Smith were denied for knee replacements based upon medical coding errors, each account would be resolved separately, thus involving a significant amount of duplication of work and time.

In order to reduce such duplication of work, automated systems have been developed which detect systemic problems as mentioned above and therefore enable resolution of the claim denial on a batch basis. Examples of such systems are disclosed in various trade articles, such as, "Accounts Receivable Management: Task Management Versus Denial Management"; MedSynergies, Inc., October 2007; and "Securing Revenue with Improved Data Use"; MedAssets, Inc., *HFMA Educational Report*, hereby incorporated by reference. These articles disclose automated systems for resolving systemic claim denials on a batch basis in order to avoid duplication of work by accounts receivable personnel, as discussed above. However, before a systemic problem can be identified, each claim denial must be analyzed on a claim by claim basis. Even though, these systems are able to utilize data learned through analysis of claim denials to prevent claim denials based on the same reasons, these systems are based strictly on denials. In addition resolution of claim denials with such systems is based on known variables; age of account and amount of claim.

Unfortunately, systems, as described above, are driven by claim denials. In other words, claims have to be denied and the reason or reasons for denial have to be ascertained before resolution of the claim denial can take place. Such systems are known to add 90-120 days to the revenue cycle from the date of discharge. Also, such systems are unable to assess and prioritize the risk of claim denial preemptively to optimize the efforts of healthcare account receivable personnel to improve revenue and decrease the revenue cycle for such healthcare accounts receivable.

Thus, there is a need for an automated accounts receivable management system which reduces the time of the revenue cycle and resolve issues prior to claim denial.

SUMMARY OF THE INVENTION

The present invention is an improvement over known systems and relates to an automated system for managing accounts receivable for outstanding healthcare accounts. In particular, the system in accordance with the present invention is an automated system which preemptively assesses the risk of denials of outstanding healthcare accounts by way of a self-learning engine driven by current data and prioritizes those accounts for follow up according to the risk profile of the account. As such, the system is able to minimize denials by the respective payers thereby improving the revenue cycle of the healthcare provider and optimizing the efforts of healthcare accounts receivable personnel in order to improve the revenue yield while minimizing the revenue cycle.

DESCRIPTION OF THE DRAWING

These and other advantages of the present invention will be readily understood with reference to the following specification and attached drawing wherein:

FIG. 3 is a list of exemplary input variables for the system in accordance with the present invention.

FIG. 6 illustrates an exemplary Risk Rules Table in accordance with one aspect of the invention.

FIG. 10A is an exemplary work list generated by the automated accounts receivable management system in accordance with the present invention.

FIG. 10B illustrates an exemplary screen shot of a follow-up advice for accounts on the work list, illustrated in FIG. 10A.

FIG. 11 is an exemplary table illustrating claim risk stratification for prioritizing follow-up and allocating resources by skill levels according to the risk profile of the accounts.

DETAILED DESCRIPTION

Figure 1:
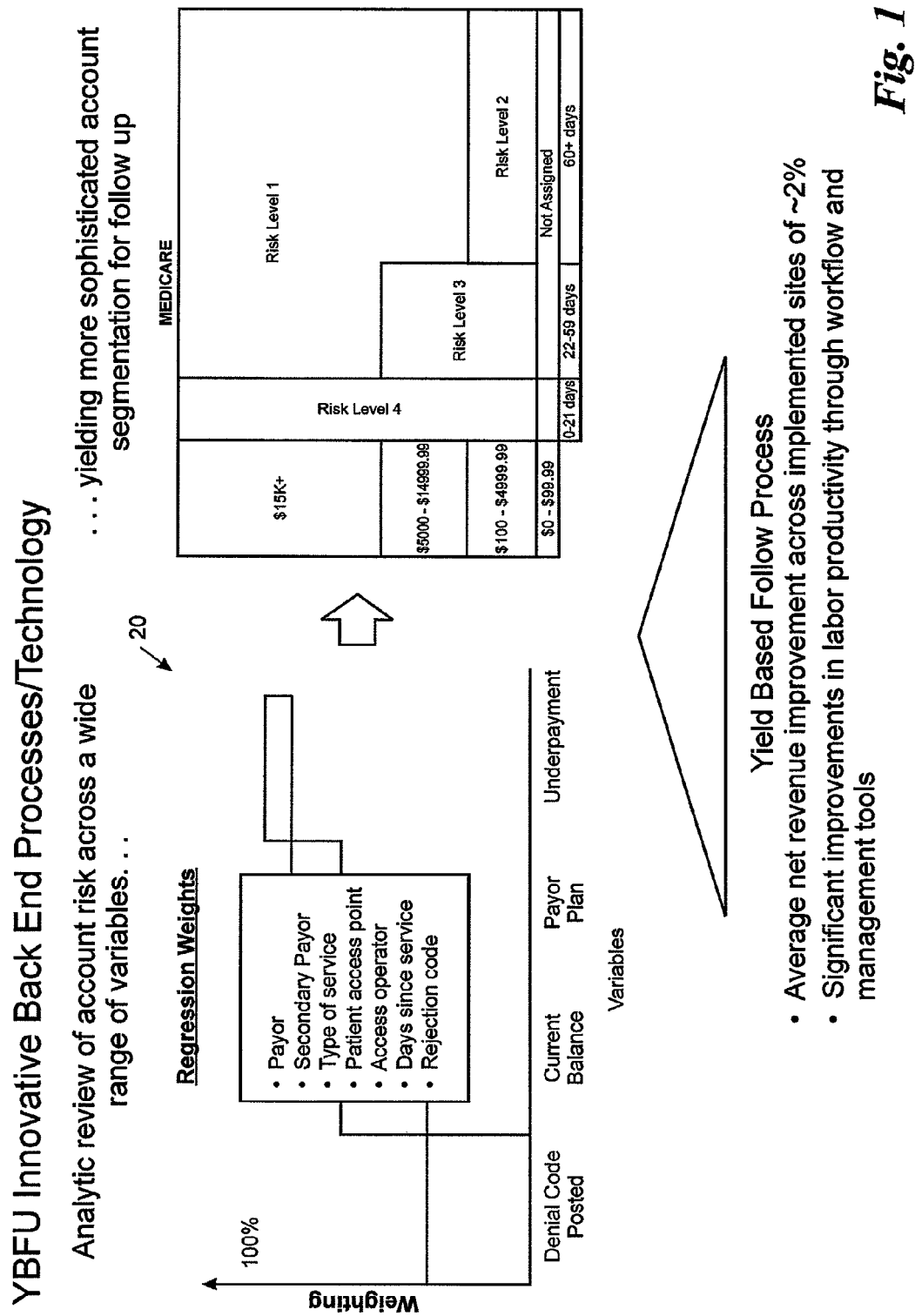
FIG. 1 is a pictorial view of the present invention illustrating a simplified view of the self-learning engine used to assess the risk of accounts and the use of the risk assessments for prioritizing follow-up by accounts receivable personnel.

The present invention relates to an improvement over known systems and relates to an automated system for managing accounts receivable for outstanding healthcare accounts. In particular, the system in accordance with the present invention is an automated system which preemptively assesses the risk of denials of outstanding healthcare accounts by way of a self-learning engine driven by current data and prioritizes those accounts for follow up according to the risk profile of the account. As such, the system is able to minimize denials by the respective payers thereby improving the revenue cycle of the healthcare provider and optimizing the efforts of healthcare accounts receivable personnel in order to improve the revenue yield while minimizing the revenue cycle.

Unlike known systems, all accounts are assessed as a function of the risk of claim denial on an automated basis as the charges are incurred. These accounts are prioritized for "back office" follow-up by accounts receivable personnel based upon the risk assessment of the payer denial. In accordance with one aspect of the invention, back office follow-up of a claim is done prior to claim submittal in order to improve the revenue yield. As such, the accounts receivable management system minimizes the revenue cycle while optimizing the efforts of back-office accounts receivable personnel.

As mentioned above, known systems base account receivable follow up only after a claim denial and prioritize the post denial follow up based upon the age of the account and the amount of the account. Even though known systems are able to process claim denials on a batch basis, the follow up only takes place after one or more claims have been denied. Moreover, the criterion for following up on claim denials does not necessarily improve the revenue yield and obviously does not improve the revenue cycle. For example, assume that a particular third party insurance company payer has a history of denying all claims for cosmetic surgeries, whether such claims are deemed to be elective or medically necessary. Elective cosmetic surgeries are normally "flipped" to patient responsibility after denial by third party insurance company payers. Collections of such accounts from patients are normally relatively more difficult than third party payer accounts and are known to be either partially or completely written off. With the relatively high cost of such surgeries, these accounts can easily run up to tens of thousands of dollars. Because of the dollar value of such accounts, known systems designate such accounts for elective surgeries for follow-up even though there is a significant risk that at least a portion of the claim will be written off. As such, the efforts of the account receivable personnel would be better spent on accounts where full payment is more likely.

The present invention approaches the problem of collections of accounts receivable in a different manner than known systems. Rather than base follow up on the amount of the account and the age of the account, for example, date from discharge, the present invention prioritizes each account for follow up as a function of the risk of denial of the claim. Unlike known systems, the present invention does not wait for a claim denial to assess the risk of denial but rather bases the risk of denial on a number of variables and utilizes a self-learning engine that is driven by current data. In particular, claims are scored based upon claim denial based upon a number of exemplary factors, including the factors as set forth below.

age of account
 balance of account
 payer
 denial history for similar claims
 type of service
 existence of secondary payer for account In the example above, because of the previous experience with the payer with claim denials for all cosmetic surgeries, whether medically necessary or elective, the system assesses the type of service based upon the medical billing codes and decides whether the claim will be covered by a third party payer. If the system determines that the claim will not be paid by a third party payer, for example, as in the case of an elective cosmetic surgery, the system will not add the claim to a work list for follow up with the third party payer. On the other hand, if the system determines that the cosmetic surgery was medically necessary, the claim, based in part upon its dollar amount and age, is "queued", i.e., placed on a work list for follow up by "back office" personnel, prior to the expected denial of the claim based upon denial history. In this case, perhaps previous denials were based on lack of additional documentation, thereby placing the account at a high risk for denial. By following up on such medically necessary cosmetic surgeries, and supplying the additional documentation, for example, to the third party payer prior to submission of the claim, the likelihood that the claim will be paid is greatly increased. In this example, follow up is based expected revenue yield improvement.

The system in accordance with the present invention is also able to optimize follow ups in situations involving a coordination of benefits between multiple third party payers. For example, claims filed for Medicare patients are normally filed with Medicare and a third party insurance company for paying a portion of the claim not covered by Medicare. Normally, the Medicare claim and the third party insurance company claim are normally filed at the same time. The third party insurance company claims are normally denied until the claim is approved by Medicare. With the present invention, rather than wait for a denial from the third party insurance company, follow up with the third party insurance company can be scheduled as soon as Medicare approves the claim. Additionally, even if the third party insurance company claim was not originally filed, the system will add a follow-up request to the account for submitting the claim to the third party insurance company. In this case, since a co-insurance claim was not initially filed, the risk of denial of the co-insurance portion of the claim would be 100%.

In accordance with another aspect of the invention, the system mines patient historical data and data from the patient's account level data and/or current or previous registrations to determine if the patient has co-insurance. If so, the system uses such data in assessing the risk of claim denial. In this situation, rather than "flipping" the balance of claim to the patient, the system adds the claim to a work list for follow up and submission of the unpaid portion of the claim to the co-insurer. Any time the payment responsibility for claim payment shifts to a new payer, the new payer is noted in the account to avoid unnecessary follow ups with incorrect payers.

In another important application of the present invention, medical billing code errors are checked prior to submission of the claim. A suitable system for checking such medical billing code errors is disclosed in commonly owned co-pending U.S. patent application Ser. No. 12/378,833, filed on Feb. 20, 2009, entitled "Automatic Detection of Medical Billing Charge and Coding Errors", hereby incorporated by reference. Other systems for detecting medical billing code errors are also suitable. For example, the National Correct Coding Initiative (NCCI) is also suitable. The NCCI was promulgated by the Centers for Medicare and Medicaid Services (CMS) and is a set of rules created to detect medical billing codes on patient billing records in which services or medical supplies are duplicated.

In the case of a medical billing code error, the risk of denial is relatively high. Rather than wait for a claim denial based upon an incorrect medical billing code, the system checks claims before the claims are filed with the third party payer and places claims with incorrect medical billing code errors on a work list for correction prior to submission of the claim. In such a situation, denial of the claim is prevented.

In another important aspect of the invention, the system can defer work on a claim if it is determined, based on prior experience with a type of claim and a payer, for example, that follow-up at the current time is unlikely to improve the chance of approval of the claim. For example, if a third party insurance company has a history of approving claims for knee replacements but does so in 34 days from the submission of a claim, the system can defer follow-up on pending claims for knee replacements with that third party payer from 30 to 34 days.

FIG. 1 is a pictorial view of the present invention illustrating a simplified view of the self-learning engine used to assess the risk of accounts and the use of the risk assessments for prioritizing follow-up by accounts receivable personnel. As shown, the automated accounts receivable management system in accordance with the present invention includes two (2) distinct processes. In general, the first process, illustrated by the box on the left and identified with the reference numeral 20, relates to assessing the risk of claim denial. As will be discussed in more detail below, this process is executed by a self learning engine that is driven by current account data. Once the accounts are analyzed for risk of claim denial, the risk levels are categorized according to the probability of the claim denial. As used herein, risk level 1 is assumed to have the highest probability of claim denial, while risk level 4 is assumed to have the lowest probability of claim denial. These risk levels are integrated into a model, as illustrated by the box on the right and identified with the reference numeral 22, in order to prioritize follow-ups. As shown, the model 22 prioritizes follow-up based on the risk levels as a function of the amount of the claim and the number of days since the patient was discharged.

FIG. 1 illustrates an exemplary configuration of the model 22 for prioritizing follow-up by back office personnel for accounts that have been prioritized. More particularly, the account value is represented on the ordinate axis and is broken down in an exemplary manner as follows:

$0-$99.99
$100-$4999.99
$5000-$14,999.99
$15,000+

The number of days since patient discharge is represented on the abscissa axis and is broken down in an exemplary manner as follows:

0-21 days
22-59 days
60 days+

As shown by the exemplary model 22, no action is taken for accounts below an exemplary value of $99.99. Irrespective of the value, accounts that are less than an exemplary 21 days old are assigned an exemplary risk level 4; the lowest risk level. After an exemplary 21 days, the accounts are prioritized as a function of their risk level, account value and the number of days since the patient was discharged. In the exemplary illustration of FIG. 1, risk level 1 is assigned to accounts that are more than $15,000 and more than 21 days has elapsed from the date of discharge. Risk level 1 is also assigned to accounts between $5000-$14,999 which are 60 days old or older. Risk level 2 is assigned to accounts that are between 22 and 59 days old and have an account value between $100 and $14,999. Risk level 3 is assigned to accounts between 22 and 59 days old having an account value between $100 and $14,999.

By prioritizing the accounts for follow-up in the manner described above, resources for back office follow up can be focused in order to provide the highest revenue yield. In other words, resources can be allocated where the resources will do the most good. As will be discussed below in detail those resources can be allocated by skill levels according to the risk profile of the accounts in order to optimize the use of those resources.

Self-Learning Engine

Figure 2:
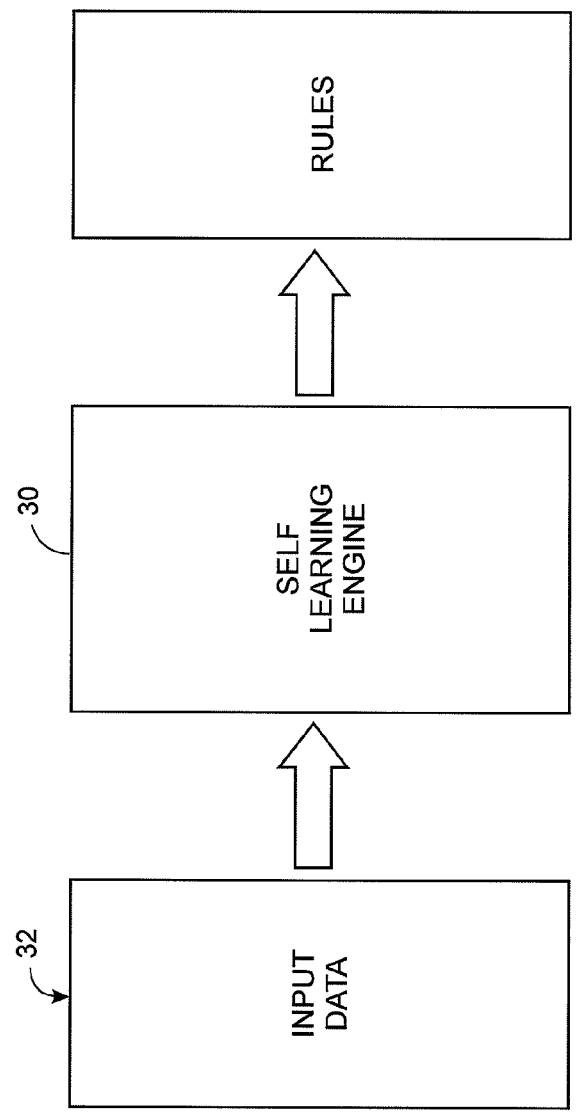
FIG. 2 is a simplified block diagram of the self-learning engine in accordance with the present invention.

A simplified view of the self learning engine in accordance with the present invention is illustrated In FIG. 2, generally identified with the reference numeral 30. The self learning engine 30 is continuously updating with patient account input data, as indicated by the box 32. Such patient account input data is normally available from a Hospital Information System (HIS).

As is known by those of ordinary skill in the art, the HIS is an integrated information system for managing the administrative, financial, and clinical aspects of a hospital. The HIS typically includes a database for warehousing various electronic medical data, such as, patient records including patient records regarding procedures and diagnoses as denoted by ICD-9 medical billing codes, used for diagnosis and in-patient medical procedures. The HIS further includes patient records of medical supplies and some professional services, denoted by CPT Codes. Such CPT codes are typically used for medical supplies, orthodontics and medical equipment and some professional services. The HIS may also warehouse other HIPPA approved medical code sets, such as HCPCS, NDC, DRG and CDT. HCPCS (Healthcare Common Procedural Coding System) codes are known to be used for physician services and other health services. NDC (National Drug Codes) Codes are known to be used by retail pharmacies while CDT (Current Dental Codes) Codes are known to be used for dental services. DRG (Diagnosis Related Group) Codes are used to classify inpatient hospital services and are commonly used by many insurance companies and Medicare. More particularly, the DRG code, the length of the inpatient stay and the CPT code are known to be combined to determine claim payment and reimbursement. The HIS 20 will also include patient charges. The patient charge records 28 are based upon the various medical billing records as discussed above.

In accordance with one aspect of the invention, continuous patient account input data from the HIS is optionally discretized in a known manner, as indicated by the box 34. By "discretizing" the input data, all input data will have finite values. Discretization of input data is discussed in detail in "Discretization Methods (Data Mining)", SQL Server 2008 Books online, March 2009, http://msdn.microsoft.com/en-us/library/ms174512.aspx, hereby incorporated by reference.

The attributes of the input data 32 define input variables. The input data 30 is fed into the self-learning engine 30 which processes the input data, for example, using a Decision Trees Algorithm, such as Microsoft Decision Trees Algorithm, to determine develop logic or Boolean rules based upon the correlation of specific attributes, i.e., input variables of the input data 32 to a particular result, as discussed below. These rules enable the behavior of the patient accounts to be predicted so that accounts receivable resources are allocated according to where the resources will do the most goods. The Microsoft Decision Trees Algorithm is discussed in detail in "Microsoft Decision Trees Algorithm Technical Reference", SQL Server 2008 Books online; March 2009 http://msdn.microsoft.com/en-us/library/cc645868.aspx, hereby incorporated by reference.

Exemplary input variables are listed in FIG. 3. As shown, the variable, identified as "Has Exception" is an exemplary result of interest and is defined as a patient visit in which there was a "denial, or a write-off or a high adjustment". Thus, in this example, the self-learning engine 30 continuously analyzes the input data 32 and determines the degree of correlation between the various input variables and the result. The degree of correlation may vary between 0 and 100%. In order to streamline the process, the self-learning engine 30 only enables rules above a predetermined activation threshold are "activated". As used herein, "activated" refers those rules that are determined to have the highest degree of correlation to result i.e., rules that are above the correlation threshold.

The self learning engine 30 continuously analyzes the input data 32 and develops rules. The correlation of the rules to a particular result, as discussed above, is continuously determined. As mentioned above, rules which are determined to have a correlation greater than a predetermined threshold are activated and used to predict account behavior. The correlation values of accounts may change over time. For example, interventions by accounts receivable back office personnel may cause the correlations of current rules to fall below the correlation threshold. In addition, all new accounts are processed by the self learning engine 30. New rules based upon the attributes of the new accounts are developed. The correlation of the new accounts to one of the "Exceptions", as discussed above is determined. For those new accounts in which are above the correlation threshold, the new rules are activated. As such, self learning engine 30 is indeed self-learning and continuously predicts the account behavior for all accounts on a continuous basis.

Figure 4:
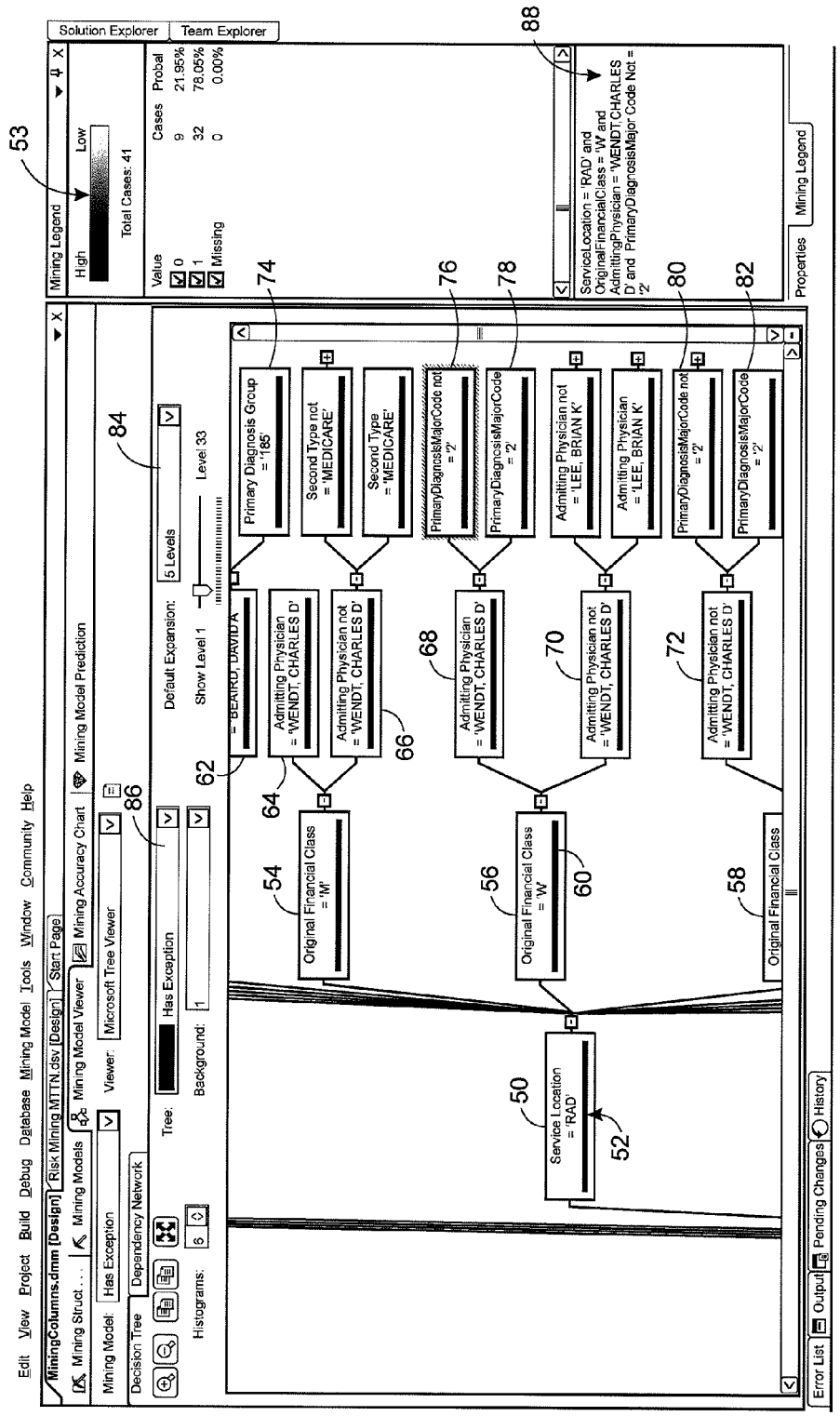
FIG. 4 is an exemplary diagram illustrating the operation of the self learning engine using decision tree analysis for the automatic generation of an exemplary rule.

An exemplary rule is illustrated in FIG. 4. As shown, the rule is automatically formed as a decision tree. Each of the boxes in the decision tree represents a node. Each of the nodes represents an attribute of the input data 30. Each node includes a gauge, similar to a gas, gauge, but which indicates the degree of correlation of that attribute to a desired result, for example, as discussed above. For example the node labeled "Service Location=RAD", identified with the reference numeral 50, includes a gauge 52. As shown, the lighter shades are used to indicate the degree of correlation between a particular attribute and the result. The gauge 60 indicates that there is a relatively low correlation between accounts which identify "RAD" as a service location and accounts that are likely to be denied, written-off or processed with high adjustments. In this particular example, the exemplary decision tree splits into multiple nodes 54, 56 and 58 based upon the "Original Financial Class" of the payer. As shown, the node 56, which represents a payer having an original financial class=W and includes a gauge 60. The gauge 60 illustrates a relatively higher correlation of account attributes in which the payer falls into the Original Financial Class "W" and which identify the service location as "RAD", relative to the node 50. In the next level of the decision tree, the nodes 62, 64, 66, 68, 70 and 72 relate to the attribute identified as "Admitting Physician". As shown by the respective gauges on the nodes 68 and 72, there is a relatively higher correlation between account data in which the admitting physician is Charles Wendt and the attributes designated by the nodes 50 and 56.

The last level of the decision tree illustrates correlation of the Primary Diagnosis Code and the result mentioned above. In particular, the nodes 76, 78, 80 and 82 represent the "Primary Diagnosis Major Code attribute. As shown, there is a relatively high correlation between the Primary Major Diagnosis Code "not=2" and the result discussed above.

As indicated by the drop down menu 84, the number of levels of the decision tree is selectable. As shown in FIG. 4, the decision tree is truncated after an exemplary five (5) levels. Note, in the example depicted in FIG. 4, the first level to the left of the node 50 is not shown. The drop down menu 86 indicates the desired result of the decision tree. In this case, the desired result is either denial of payment; write-off or high adjustment.

In the exemplary decision tree, illustrated in FIG. 4, the rule is illustrated in the bottom right hand corner of FIG. 4 and identified with the reference numeral 88. In this example, the rule 88 is extracted from the last level of the decision tree, in this case level 5. This rule 88 based upon its correlation with the "Exception" or desired result, as defined above, is determined to be accounts having the following attributes: Service Location+RAD and Original. Financial. Class=W and Admitting Physician=Charles Wendt and Primary Diagnosis. Major Code not=2. As shown in the upper right hand corner of FIG. 3, the rule 88 was developed based upon 41 cases and that 32 of the 41 cases or 78.05% of those cases with the attributes contained in the rule 88 resulted in a denial, write-off or high adjustment. Based on such a high correlation, the attributes in the rule 88 can be used to predict the behavior of new accounts having the same attributes as those that form rule 88.

Figure 5:
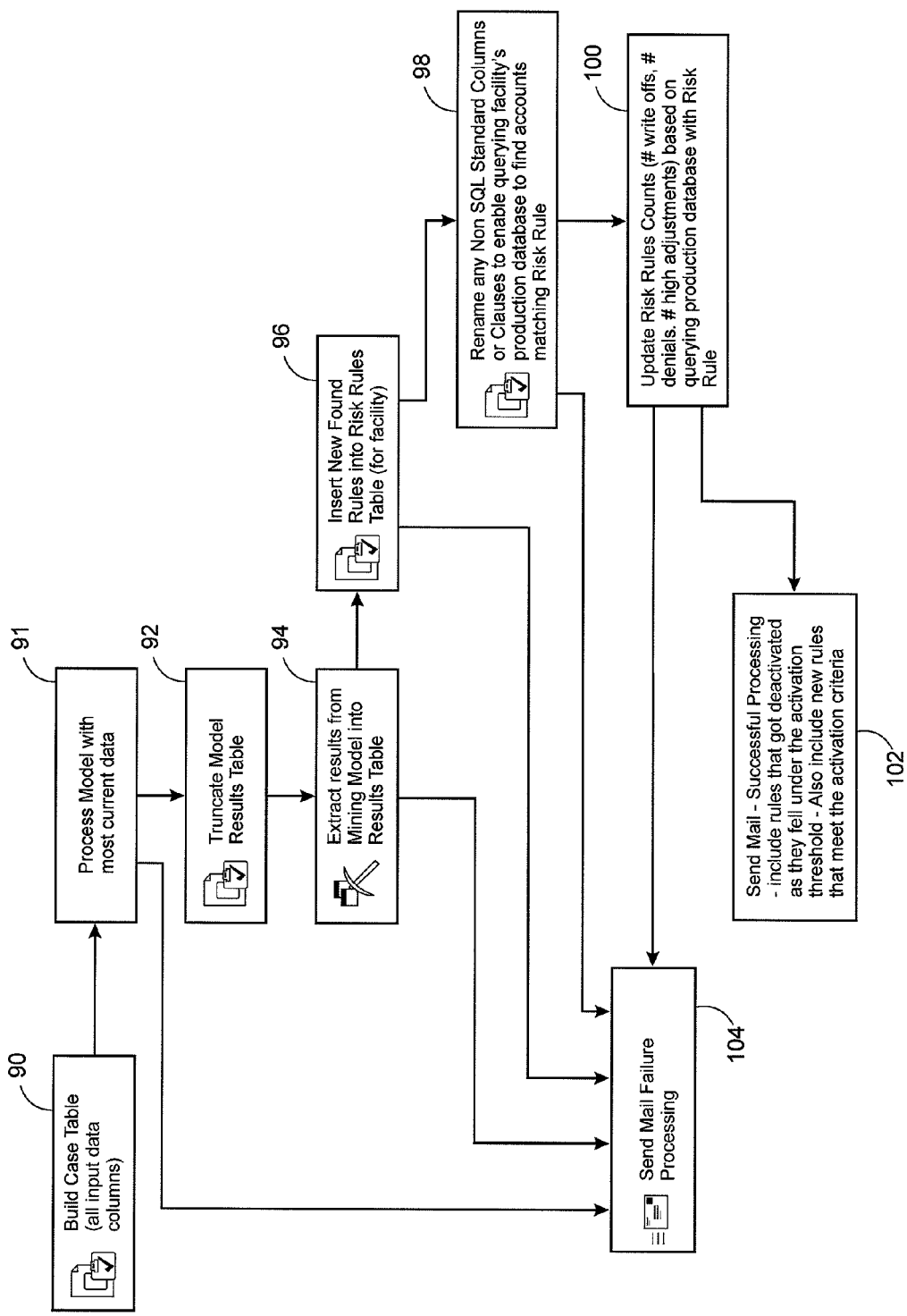
FIG. 5 is a data flow diagram of the self-learning engine illustrated in FIG. 2

FIG. 5 is a data flow diagram of the automated system for managing accounts receivable 20 in accordance with the present invention. Initially in step 90, all account input data 32 is continuously applied to the self learning engine 30. The self learning engine 30 processes the data in step 91 in a manner as discussed above and continuously creates rules based on the correlation of the attributes of the input data 30 to a particular result. In this case, the result is either denial of payment; write-off or high adjustment. As mentioned above, the number of levels of the decision tree is truncated to stream line the process, as indicated in step 92. In step 94, the results of the decision tree or mining model are extracted and a rule 88 (FIG. 3) is generated in step 94, as discussed above. The rule 88 is then inserted into a risk rules table (see FIG. 4) in step 96. In step 98, non standard attributes, i.e., non-SQL Standard Columns or Clauses, are renamed to enable the account data to be queried to identify those accounts which match the attributes of the rule. However, only those rules which have a correlation to an "Exception" greater than a correlation threshold are activated. All other rules are de-activated. Those accounts which have the same attributes as the activated rule are placed in another database identified as "Risk Rule Counts", in step 100. In steps 102 and 104, the self learning engine 30 may be configured to report the success or failure of the processing to the system administrator.

Risk Assessment

FIG. 6 illustrates an exemplary Risk Rules Table. Account data is processed on a batch basis at predetermined intervals, for example, daily intervals. The Risk Rules Table illustrated in FIG. 6 represents the results of processing account data, for example, for one (1) day by the self learning engine 30. FIG. 6 illustrates the extracted rules from the decision tree in Column 100.

Figure 8:
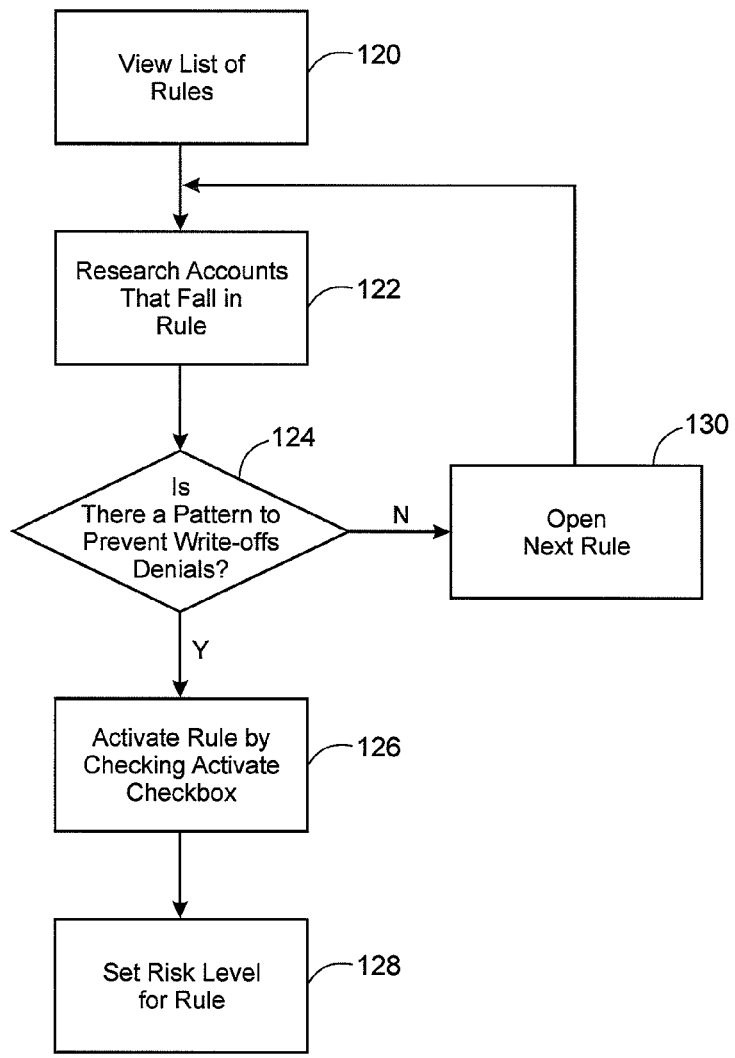
FIG. 8 is an exemplary flow chart for activating risk rules and assigning a risk level.
Figure 9:
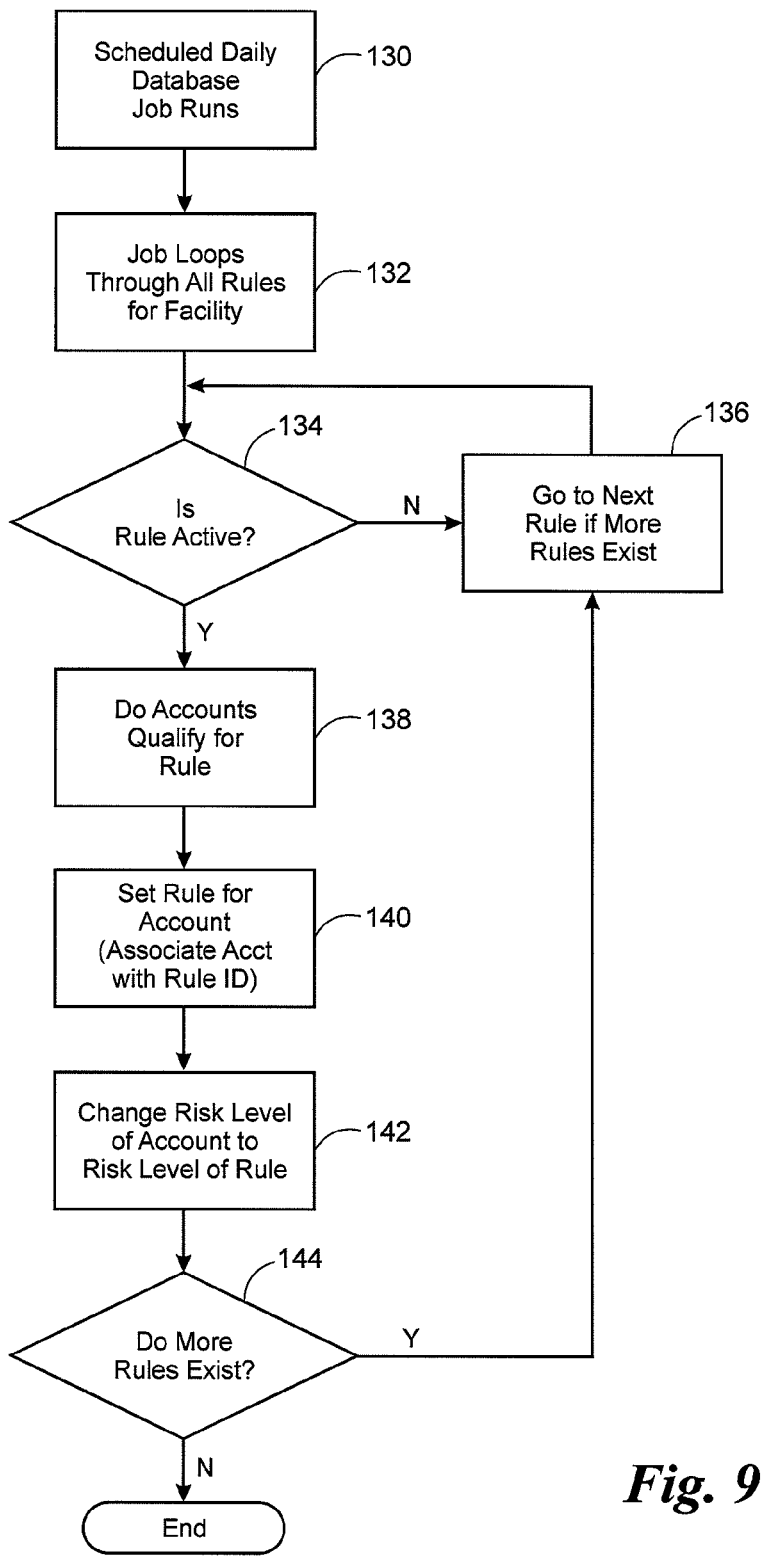
FIG. 9 is a flow chart for applying the risk rules to the account data.

Column 102 illustrates whether the rule is active. As indicated above, only rules having a correlation to an exception greater than a predetermined value are activated. Even though the activation thresholds illustrated in Column 108 of FIG. 6, these rules may be further analyzed to determine whether the rule should be activated and what the risk level should be. As shown in FIG. 6, only the rules on lines 6 and 7 are shown as activated, as indicated by the "yes" in Column 102. The criteria for activating the rules and setting the risk level is illustrated in FIGS. 8 and 9 and discussed below.

The rest of the rules designated with "No" in column 102 are inactive. As illustrated in FIG. 3, Input Data identified with any of the following descriptions is ignored:

"Has Denials
"Has Write-Off"
"Has Write-Off or Denial"
"High Adjustment"

With respect to the active rules, the number of exceptions is illustrated in Column 104. As shown, in FIG. 6, the Rule on line 6 registered exceptions in 100% of the 82 cases examined. Similarly, the Rule on line 7 registered exceptions in 100% of the 12 cases examined. A risk level is assigned to each of the rules, based upon the weight of the exceptions, as discussed below. As illustrated in FIG. 6, the Rule on line 6 is assigned a Risk level 1, as indicated in Column 106, while the Rule on line 7 is assigned a risk level 2.

Figure 7:
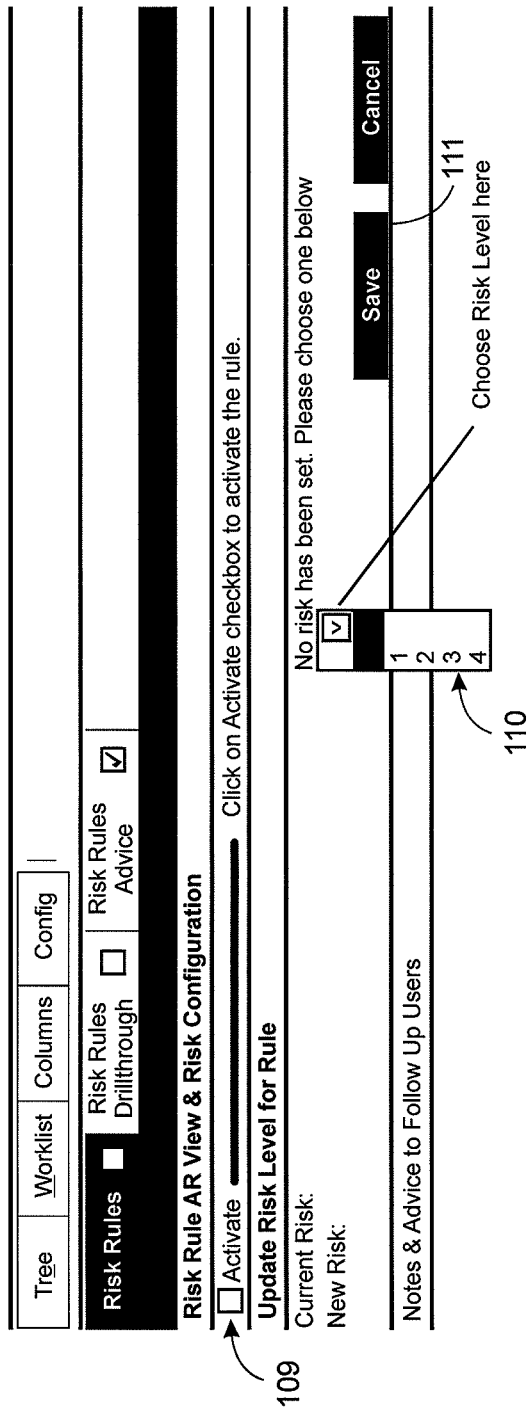
FIG. 7 illustrates a dialog screen for manually activating rules generated by the self learning engine in accordance with the present invention and manually assigning risks to those rules.

The Risk level and activation of the rule may be set manually. More particularly, each rule on the Risk Rules Table, illustrated in FIG. 6 may be selected. Once a rule is selected, a dialog screen pops up. The dialog screen is illustrated in FIG. 7 includes a check box 109 for activating a rule and a drop down menu 110 for assigning a risk value to the rule. If a rule is not activated, the save button 111 is selected and Column 102 (FIG. 6) of the Risk Rules Table is updated with a "No". If a rule is activated, a risk value may be assigned to the rule. As shown in FIG. 7, exemplary risk values from 1-4 may be selected. Once the risk value is selected, the save button 111 is selected which results in the Active column 102 in the Risk Rules Table to be updated as "Yes" and the selected risk level to be updated in Column 106.

FIG. 8 is an exemplary flow chart for activating risk rules and assigning a risk level. Initially in step 120, the rules in the Risk Rules Table (FIG. 6) are reviewed. Next, in step 122, the accounts that fall under the rule are reviewed. While reviewing the accounts that fall under a specific rule, the reviewer notes whether there is a pattern in the accounts to prevent write-offs or denials, such as a medical coding error, etc., in step 124. As will be discussed in more detail in connection with FIG. 10, the reasons for each denial on an account by account basis are listed on a work list. If there is a pattern which would allow multiple accounts to be handled at one time, the rule can be activated in step 126, as discussed above. Once a rule is activated, the risk level for the rule can be set in step 126, as also discussed above. In general, the risk level is selected based upon various factors including the age of the account and the value of the account. In general, in addition to the age of the account and the value of the account, the risk level is selected based upon continuous updating of the accounts by the self-learning engine 30 (FIG. 2) The accounts along with the risk levels are listed in a work list, for example, a work list as illustrated in FIG. 10. The user then proceeds to the next rule on the Risk Rules Table (FIG. 6) and repeats steps 122-128. If in step 124, the user determines that there is no pattern in the accounts for a specific rule, the user proceeds to the next rule, as indicated in step 130.

FIG. 9 is a flow chart for applying the risk rules to the account data. Initially, input account data 32 (FIG. 2) is processed by the self-learning engine 30 at predetermined time intervals, for example, daily intervals, as indicated in step 130. In step 132, the self learning engine 30 processes all input account data 32 for the specified time period by the decision tree process, discussed above. Because changes in account data can occur in a relatively short time due to the interventions of account receivable back office personnel, the system checks whether previously active rules are still active in step 134. If not, the system proceeds to the next rule in step 136.

If it is determined in step 134 that the rule is still active, the system locates new accounts that fall under the rule in step 138. In step 140, accounts are identified with the rule. Next; in step 142, the system checks whether the risk level of the account is the same as the risk level of the rule. If not, the system automatically changes the risk level of the account to the risk level of the rule. In step 144, the system checks for more rules. If more rules exist, the system loops to step 136 and processes the next rule by repeating steps 134-144. This process is repeated until the last rule is processed.

Exemplary Work List

FIG. 10A is an exemplary work list generated by the automated accounts receivable management system in accordance with the present invention. The work list lists accounts and the risk level associated with each account. In particular, the account information is listed in Column 150. The age of the account or date from discharge "DFD" is listed in Column 152, while the value of the account balance is listed in Column 154. For claims that have previously been denied, the value of the denial is provided in Column 156. In accordance with an important aspect of the invention, various accounts which have not yet been denied are on the work list, i.e the accounts listed on lines 4, 5, 6, 8, 10 and 13. These accounts are thus worked based upon a predicted denial by the self-learning engine 30. Column 158 identifies a denial code for those accounts in which a claim has been submitted to a third party payer and denied while Column 160 identifies the category of the denial. The risk level is illustrated in Column 162.

As shown, the exemplary accounts are all ranked Risk Level 1. In addition, the accounts are ranked according to the general profile, illustrated in FIG. 1. In particular, the accounts are ranked from the highest balance illustrated in Column 154 to the lowest balance for accounts which fall into the age profile illustrated in FIG. 1. With a work list as illustrated in FIG. 10, the accounts can be worked to optimize the revenue yield for accounts for which claims have been filed and denied and new accounts which have not yet been sent to a third party payer for payment.

In order to facilitate follow-up by back office personnel on accounts listed on the work list, illustrated in FIG. 10A, the system may optionally provide follow-up advice and attach that advice to specific accounts. In particular, an exemplary screen shot of follow up advice is illustrated in FIG. 10B. The follow-up advice may be implemented as a pop up in a manner well known in the art which pops up any time a curser is dragged on to an account on the work list and disappear when the curser is removed from the account. The goal of the advice is to provide guidance to back office personnel to minimize the risk of claim denial and/or write off for an account. The follow-up advice may be based upon previous history with the type of claim, the payer or other factors.

Claim Risk Stratification

FIG. 11 is an exemplary table illustrating claim risk stratification for prioritizing follow-up and allocating resources by skill levels according to the risk profile of the accounts. The table illustrates an exemplary process to allocate resources by skill level of back office personnel as a function of the risk profile of the account. In accordance with this aspect of the invention, the resources of the back office personnel can be optimized.

Revenue Cycle

The goals of the invention are as follows:
Decrease Preventable Write-Offs
Prioritize follow-up utilizing the tools discussed above
Align the best resources to the increasingly complex, high risk accounts.

The main goal of the invention is to prevent or decrease all preventable write-offs, denials and high adjustments by putting all at-risk accounts through several layers of scrutiny to mitigate the risk of write-offs, denials and high adjustments by learning the reasons therefore and looping this information back to upstream processes to enable incrementally better data collection, audit and cleansing methodologies. The process described above optimizes the overall process by providing a level of segmentation of risk for increasingly complex accounts and routing these accounts to specialized staff which possesses the depth of knowledge to get the account to a successful adjudication.

Figure 12:
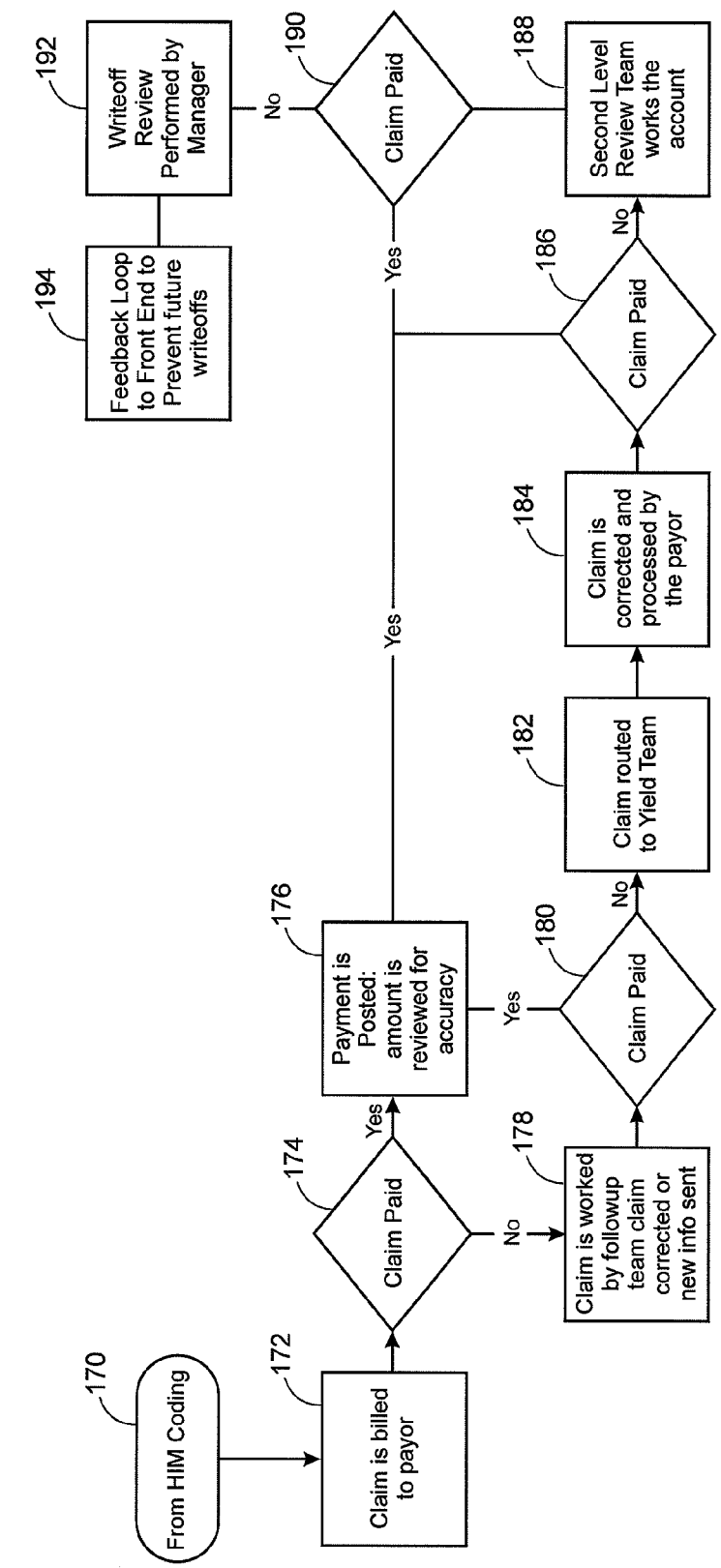
FIG. 12 is an exemplary process illustrating an entire revenue cycle.

FIG. 12 is an exemplary process illustrating an entire revenue cycle. Initially in step 170, account level data is created from medical billing codes and a claim is created, as discussed above. In step 172, the claim is billed to a third party payer. If the claim is paid, as determined in step 174, the payment is posted in step and reviewed for accuracy. If the claim is not paid, the claim is worked by a follow up team with corrected or new information in step 178. If the claim is paid after follow-up, as indicated by step 180, the claim is posted in step 176. If the claim is, not paid after initial follow-up, the claim is routed to a specialized staff, i.e., yield team, for follow-up in step 182. The specialized staff attempts to correct the problem, in a manner as discussed above, and sent to the third party payer in step 184. If the claim is paid, as indicated in step 186, the payment is posted in step 176, as discussed above. If the claim is not paid after follow-up by the specialized staff, a second level review team works the account in step 188 and attempts to resolve the issues with the claim and resubmits the claim for payment. If the claim is paid after the second level review, as indicated by step 190, the payment is posted in step 176. If the claim is not paid after follow-up by the second level review team, the claim is passed to a manager for review and write-off in step 192. Information from the claim denial is fed back to front office personnel in step 194 to prevent future write-offs and denials.

Obviously, many modifications and variations of the present invention are possible in light of the above teachings. Thus, it is to be understood that, within the scope of the appended claims, the invention may be practiced otherwise than as specifically described above.

We claim:

1. An automated system for managing healthcare patient accounts comprising:
    a computer system including a computer which is programmed with a self learning engine, said computer system further programmed to perform the following steps:
    (a) receive patient account input data including type of service; denial history for similar claims; and payer for each patient account;
    (b) based upon the patient account input data, the computer system is further programmed to automatically generate probabilities of claim denials defining risk levels for patient accounts based upon the history of denials for similar claims, the balance of the patient account and the age of the patient account; and
    (c) based upon the risk levels, the computer system is programmed to automatically analyze patient accounts as a function of their respective risk levels and prioritize those analyzed accounts as a function of said risk levels so that patient accounts with the lowest risk level of denial are assigned the highest priority and patient accounts with the highest risk level of denial are assigned the lowest priority, said priorities also assigned as a function of a combination of the balance of the patient account and the age of the patient account; and
    (d) said computer system further programmed to prioritize said patient accounts in a work list for follow-up according to their respective risk of denial in order to improve the revenue cycle.

2. The automated system as recited in claim 1, further comprising:
    said computer system further programmed to follow-up of on said patient accounts as a function of the risk level of said patient account and the level of skill of the back office personnel.

3. The automated system as recited in claim 1, further comprising:
    said computer system further programmed to automatically generating probabilities of claim denials defining risk levels for patient accounts based upon payment behavior of a particular payor learned as a function of a history of denials of similar claims from said particular payor.

4. The automated system as recited in claim 1 further comprising:
    said computer system further programmed to automatically generating probabilities of claim denials defining risk levels for patient accounts based upon attributes of said input data that are expected to result in a write-off based upon previous denials of similar claims with one or more common attributes, said risk levels learned as a function of the claim denials and attributes of previous patient accounts.

5. The automated system as recited in claim 1 further comprising:
    said computer system further programmed to automatically generating probabilities of claim denials defining risk levels for patient accounts based upon attributes of said input data that are expected to result in an adjustment based upon previous denials of similar claims with one or more common attributes, said risk levels learned as a function of the claim denials and attributes of previous patient accounts.

6. The automated system as recited in claim 1 further comprising:
    said computer system further programmed to automatically generating probabilities of claim denials defining risk levels for patient accounts based upon attributes of said input data that are expected to result in a predetermined outcome based upon previous denials of similar claims with one or more common attributes, said previous patient accounts with attributes resulting in said predetermined outcomes defining rules.

7. The automated system as recited in claim 6 further comprising:
    said computer system further programmed to continuously correlate said rules to said predetermined outcome.

8. The automated system as recited in claim 7 further comprising:
    said computer system further programmed to determine the degree of correlation of said rules to said predetermined outcome.

9. The automated system as recited in claim 8 further comprising:
    said computer system further programmed to applying said rule to said input data to predict the probability of claim denial only when said degree of correlation is greater than a predetermined threshold.

10. The automated system as recited in claim 1 further comprising:
    said computer system further programmed to receive patient account input data including type of service; denial history for similar claims; and payer for each patient account before a claim is submitted to a payer.

11. The automated system as recited in claim 1, further comprising:

said computer system further programmed to schedule follow-up of third party insurance claims based upon approval of a Medicare claim.

12. The automated system as recited in claim 1, further comprising:
said computer system further programmed to mine patient data to determine if the patient has co-insurance; and
add the claim to the work list for follow-up on any unpaid portion of a claim.

13. The automated system as recited in claim 1, further comprising:
said computer system further programmed so that said self-learning engine continuously analyzes the input data to develop rules in order to predict the behavior of the patient accounts based upon learned attributes of the input data.

14. The automated system as recited in claim 13, further comprising:
said computer system further programmed so that said self-learning engine can predict the behavior of the patient accounts based upon the input data and categorize the rules into one or more of the following categories: "Has Denials"; "Has Write-off"; "Has Write-off or Denial"; or "High Adjustment".

* * * * *